April 26, 1927.
W. BREWSTER
1,626,074
GLASS PARTITION FOR CLOSED AUTOMOBILE BODIES
Filed Oct. 25, 1926
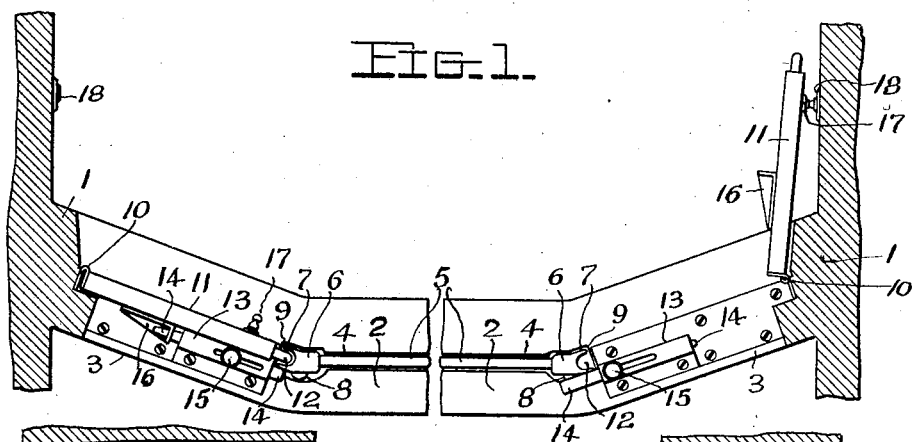
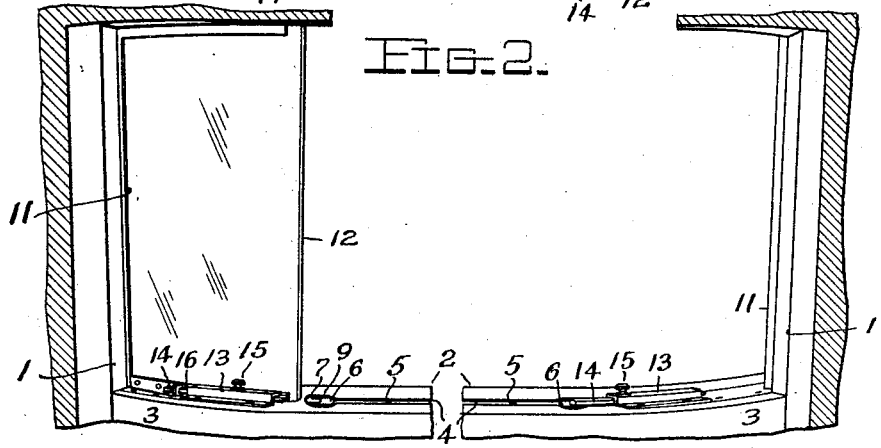
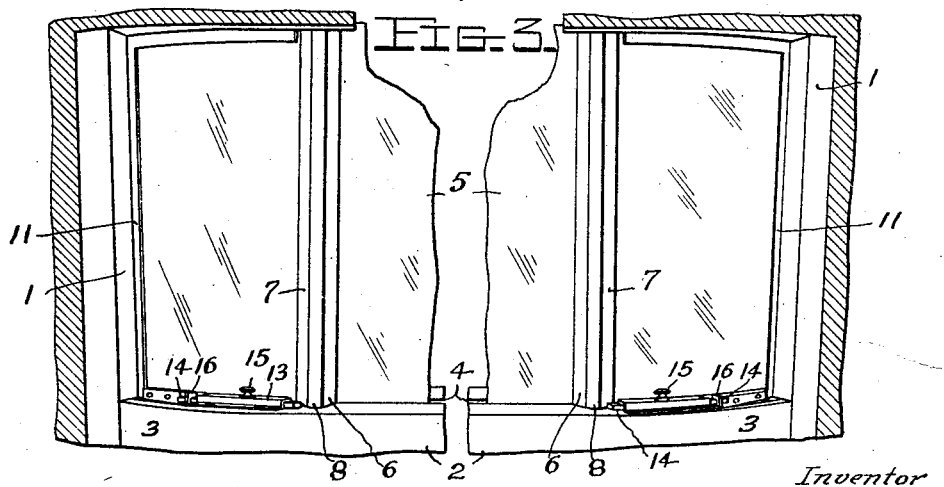
Inventor
William Brewster
by
Attorney Patented Apr. 26, 1927.

1,626,074

UNITED STATES PATENT OFFICE.

WILLIAM BREWSTER, OF NEW YORK, N. Y.

GLASS PARTITION FOR CLOSED AUTOMOBILE BODIES.

Application filed October 25, 1926. Serial No. 143,847.

This invention relates to glass partitions for closed automobile bodies, and has for its chief object to provide a structure entirely of glass which shall partition the rear of the body from the front, and at the same time to give the driver more room.

A further object is to enable the partition to be quickly removed as occasion may demand, and a still further object is to so constitute the partition that its central or main portion may extend to the top of the car body or only part way to the top as may be desired.

For a clear understanding of the invention the description hereinafter furnished will be ample when read in connection with the accompanying drawings, in which latter—

Figure 1 is a top plan view of the front seat with this invention applied thereto, the sides and pillars of the automobile body being sectioned and broken away, Figure 2 is a perspective view from the rear with the body of the automobile in vertical section, showing the central glass lowered and one side door closed and bolted, and Figure 3 is a view similar to Figure 2 but showing the central glass fully raised and the side doors closed and bolted.

Similar numerals of reference denote like parts in the several figures of the drawing.

1 are what are known as the pillars which are parts of the sides of an automobile body, 2 is the straight central portion of the back of the front seat, and 3 are the end portions of said back which are inclined forward and adjoin said pillars.

As a matter of fact this portion 2 of the front seat is located a little further back than usual, and the end portions 3 adjoin the pillars at or about the same location as that occupied by the ends of the ordinary front seats, so that it will be clear that the driver has a little more room than usual.

Extending down through the part 2 is a glass window well or pocket 4, such as is ordinarily provided, and within this pocket is a central glass 5, the depth of the pocket being such that the glass may be located entirely within the same and be free to move therein in a vertical plane as usual.

Cemented to the side edges of this glass are strips 6 which have integral therewith channels 7 that are inclined forwardly, and secured in any suitable manner to these strips intermediate the latter and the channels are moldings 8 which extend throughout the length of said strips and channels.

The pocket 4 extends laterally within the end portions 3, but these extensions 9 of said pocket are deflected forwardly so as to accommodate the angularly disposed channels 7, which latter are directed toward the sides of the automobile body for the purpose presently explained.

Hinged at 10 to the pillars 1 are glass doors 11 extending in height from the upper edge of the seat to the top of the car, and the front or free edges 12 of the glasses in these doors extend slightly beyond the door frames, so that when the central glass structure is fully down and these doors swung rearwardly to closed position, these edges will be immediately above the channels so as to aline therewith, whereby, when the central glass is raised the channels will engage said edges and slide therealong, thus making a complete partition across the body of the car.

In order that the side doors may be held firmly in their closed position, bolt housings 13 are secured to the upper face of the seat back within which are bolts 14 operated in the usual manner by finger knobs 15, and each door carries at its lower edge a socket 16 within which the noses of the bolts engage to secure the doors.

When it is desired to remove the partition, the central glass is lowered completely within its pocket which will bring the channels clear of the edges of the doors, and the bolts are manipulated to free the doors, and this movement of the bolts will cause their rear ends to shoot across and immediately above the moldings 8 so as to lock the central glass as against upward movement.

Since this central glass is preferably automatically elevated by the usual spring roller employed in such instances, it will therefore be clear that, whenever the side doors are closed and the bolts operated to lock them, the central glass will be released and will automatically be elevated. As the action of this spring roller can be checked at any time, it will likewise be clear that the central glass may be fully raised or elevated only part way, as may be desired.

When the glass doors are swung forwardly to open position, any suitable means may be employed to hold them open, and, in the present instance, small studs 17 are carried by the upper outer portions of the doors and these studs are engaged within ordinary snap sockets 18 to hold the doors when they are swung to open position.

It is, of course, possible to utilize the side doors in their closed and locked positions without raising the central glass, but it is far preferable to utilize the central glass, since the latter together with the side doors, constitute an all glass removable partition, which is far more desirable than the partition now in vogue in which the ends of the front seat are similarly inclined and wooden extensions from the pillars projected in alinement with said ends and provided with grooves within which the side edges of the central glass track.

Instead of elevating the central glass by means of the usual spring roller, this glass may be raised by any suitable means, the present invention having nothing whatever to do with the means whereby said glass is raised.

Having thus described my invention what I claim as new is:—

1. A removable glass partition for closed automobile bodies, comprising a central glass adapted to be normally housed within a vertical pocket in the back of the front seat and having channels secured to its side edges, and side glasses hinged to the automobile body at each side of the central glass and adapted when closed to present their free edges in alinement with said channels, whereby when the central glass is raised said channels will travel along said edges, and a glass partition be thereby provided.

2. An all glass partition for closed automobile bodies, comprising a vertically slidable central glass, and hinged side glasses, the sides of the central glass being slidable along the free edges of the hinged glasses.

3. A construction as in claim 1, in which the ends of the back of the front seat are inclined forwardly and the channels of the central glass similarly inclined, the side glasses being so hinged that when closed their free edges will be alined with said channels.

4. A construction as in claim 1, with the addition that means is provided for locking the side glasses when closed whereby they will be firmly held for cooperation with the central glass.

5. A construction as in claim 1, in which the ends of the front seat are inclined forwardly and the channels of the central glass similarly inclined, the side glasses being so hinged that when they are swung to closed position they will be in vertical alinement with said ends and with their front edges alined with the channels fixed to the central glass.

In testimony whereof I affix my signature hereto.

WILLIAM BREWSTER.